United States Patent [19]
Horie

[11] Patent Number: 5,748,076
[45] Date of Patent: May 5, 1998

[54] APPARATUS FOR ALARMING OF AN ABNORMALITY OF TIRE AIR PRESSURE

[75] Inventor: Hiroto Horie, Akashi, Japan

[73] Assignees: Sumitomo Rubber Industries, Ltd., Hyogo-ken; Sumitomo Electric Industries, Ltd., Osaka-fu, both of Japan

[21] Appl. No.: 532,222

[22] Filed: Sep. 22, 1995

[30] Foreign Application Priority Data

Sep. 27, 1994 [JP] Japan ................................ 6-231621

[51] Int. Cl.⁶ .......................... B60C 23/00; B60C 23/02
[52] U.S. Cl. .......................... 340/442; 340/445; 340/447; 73/146.4; 73/146.5
[58] Field of Search ................................ 340/442, 443, 340/444, 445, 446, 447, 448, 691, 506; 73/146.2, 146.3, 146.4, 146.5; 116/34 R

[56] References Cited

U.S. PATENT DOCUMENTS

| | | | |
|---|---|---|---|
| 3,810,090 | 5/1974 | Davis, Jr. et al. | 340/447 |
| 3,873,965 | 3/1975 | Garcia | 340/447 |
| 3,982,225 | 9/1976 | Schlanzky | 340/442 |
| 4,004,270 | 1/1977 | Clayton et al. | 340/442 |
| 4,131,877 | 12/1978 | Stewart | 340/445 |
| 4,281,220 | 7/1981 | Frailey | 179/90 AD |
| 4,300,120 | 11/1981 | Surman | 340/447 |
| 4,909,074 | 3/1990 | Gerresheim | 73/126.5 |
| 4,969,134 | 11/1990 | Balderson | 368/239 |
| 5,109,213 | 4/1992 | Williams | 340/442 |

FOREIGN PATENT DOCUMENTS

| | | | |
|---|---|---|---|
| 4410941 | 10/1964 | Germany | B60C 23/02 |
| 9325881 | 12/1993 | WIPO | B60C 20/06 |

*Primary Examiner*—Brent A. Swarthout
*Assistant Examiner*—Van T. Trieu
*Attorney, Agent, or Firm*—Birch, Stewart, Kolasch & Birch, LLP

[57] ABSTRACT

An apparatus for alarming of an abnormality of tire air pressure, comprising a detection mechanism capable of detecting air pressure abnormality of each tire, and only one display mechanism capable of displaying only ON or OFF state; wherein the display mechanism is capable of outputting a plurality of display patterns to inform of plural kinds of information with the display patterns. The alarming apparatus of the present invention is capable of infoming of the abnormality alarm, failure, or state of calibration with one display mechanism. Therefore, it is possible to reduce the occupying area of the combination meter display section of a vehicle, with a reduced cost.

7 Claims, 4 Drawing Sheets

EXAMPLE OF DISPLAY PATTERNS

EXAMPLE OF DISPLAY PATTERNS

POSITIONS OF TIRES CORRESPONDING
TO THE DISPLAY PATTERNS IN FIG. 1

AN EXAMPLE OF DISPLAY PATTERNS
OF A DISPLAY MECHANISM

ANOTHER EXAMPLE OF DISPLAY
PATTERNS OF A DISPLAY MECHANISM

STILL ANOTHER EXAMPLE OF DISPLAY
PATTERNS OF A DISPLAY MECHANISM

APPARATUS FOR ALARMING OF AN ABNORMALITY OF TIRE AIR PRESSURE

BACKGROUND OF THE INVENTION

The present invention relates to an apparatus for alarming of an abnormality of tire air pressure, and more particularly, to an apparatus for alarming of an abnormality of tire air pressure capable of sending a plurality of information by changing an ON or OFF display pattern even with one lamp indicator to inform a driver of the nature of information.

It is desirable that the tire's air pressure is essentially within a range which is set for a vehicle. However, the air pressure may drop due to puncture, damage to a valve or air leak from an inner liner, or the air pressure rises due to excessive load weight or other cause. When a vehicle continues driving with the air pressure being dropped or raised, the tire might burst to cause an accident in a worst case. Thus, many apparatuses have been proposed which alarms of an abnormality of tire air pressure.

For example, in Japanese Unexamined Patent Publication No. 271907/1992, there is proposed a method wherein, in a vehicle equipped with four tires, an alarm lamp is prepared for each tire, and, when the air pressure abnormality of a tire is detected, a lamp lights up corresponding to that tire's position. Moreover, in Japanese Unexamined Patent Publication No. 190506/1989, there is proposed a method wherein only one alarm lamp lights up when the abnormality of inside pressure is detected for any one wheel.

If a vehicle is equipped with a centralized display mechanism (for example, navigation monitor) capable of displaying a plurality of characters or patterns on one screen, a driver can easily recognize the contents of the alarm, even with a single alarm lamp, by displaying any information on that screen.

However, when the tire's abnormality information is provided to a driver by means of an apparatus for alarming of an abnormality of tire air pressure in a vehicle without such centralized display mechanism, it is necessary to use a large display mechanism such as a lamp unit corresponding to the position and numbers of the tires. Moreover, it is required to use a display mechanism to indicate the failure of the apparatus.

However, the size of the combination meter display mechanism of a vehicle is limited, so that it is difficult to add such a large lamp unit in view of existence of other warning lamps and meters.

Moreover, in the case of a regular passenger car, if four lamp units are installed to show the position of the tires corresponding to four tires, it is necessary to display the alarm so that it will not be mistaken with "unclosed door" warning lamp that is frequently activated.

The present invention is made to solve the above conventional problems, and, accordingly, it is an object of the present invention to provide an apparatus for alarming of an abnormality of tire air pressure capable of informing of the position of a tire showing the abnormal air pressure and of the type of failure by changing the display pattern with only one display lamp.

SUMMARY OF THE INVENTION

In accordance with the invention there is provided an apparatus for alarming of an abnormality of tire air pressure, comprising a detection mechanism capable of detecting air pressure abnormality of each tire, and only one display mechanism capable of displaying only ON or OFF state; wherein the display mechanism is capable of outputting a plurality of display patterns to inform of plural kinds of information with the display patterns.

Further, in the invention, the display pattern informs of ofposition of a tire when the information is of an abnormality of tire air pressure detected by the detection mechanism.

Further, in the invention, the display pattern informs of the kind of failure when the information is failure of the detection mechanism or display mechanism.

In accordance with the invention, there is provided an apparatus for alarming of an abnormality of tire air pressure, comprising a detection mechanism capable of detecting air pressure abnormality of each tire, only one display mechanism capable of displaying only ON or OFF state, and a switching mechanism connected to the display mechanism; wherein the display mechanism is capable of outputting a plurality of display patterns, and the apparatus is so designed that, when the switching mechanism is entered after the display mechanism has once given an alarm informing of an abnormality, the display mechanism switches the display pattern to inform of the position of a tire, with the display pattern, of which air pressure abnormality has been detected.

According to the invention, it is possible even for the only one display mechanism to inform the driver of several kinds of information by allowing the display mechanism capable of displaying only ON or OFF state to show a plurality of display patterns.

In the invention, a switch is provided in addition to the only one display mechanism, and when the switch is entered after abnormality of an tire air pressure is informed, the display pattern is changed to show the position of the tire of which air pressure abnormality is detected.

DETAILED DESCRIPTION

Next, description is given on an apparatus for alarming of an abnormality of tire air pressure (hereinafter, referred to as alarming apparatus) of the present invention with reference to the attached drawings.

In the alarming apparatus of the present invention, it is possible to suitably adopt a detection mechanism that has been conventionally used as a detection mechanism capable of detecting air pressure abnormality of each tire. That is, it is possible to use a mechanism in which the inside pressure, temperature or numbers of vibration of a tire is measured, the obtained measurement value signal is sent to the vehicle side and calculated to detect abnormality of tire air pressure, or a mechanism in which abnormality of tire air pressure is indirectly detected from the tire's angular velocity signal.

Moreover, it is possible to use a mechanism giving visual or aural signals such as a lamp and a buzzer. The contents of the information to be informed to a driver with a display mechanism might be the presence of an abnormality of tire air pressure and a position where the air pressure abnormality has occurred, the presence of failure in the detection mechanism or display mechanism and the type of the failure, the state of calibration (an operation to return the evaluation value to zero with which an abnormality of tire's inside air pressure is detected, when the tire's inside air pressure is adjusted to the prescribed value for the vehicle), as well as the failure inside the microcomputer, a failure in the switch, and a failure in the input of a wheel's speed.

Examples of specific display patterns are explained based on FIGS. 1 to 4.

Figure 1:
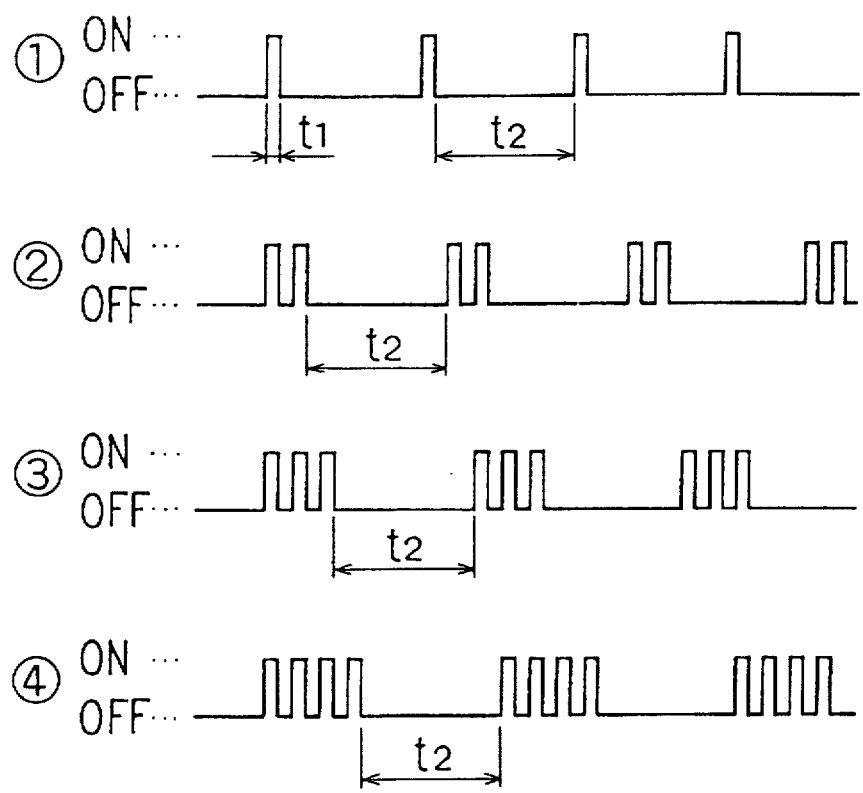
FIG. 1 shows one example of display patterns that a display mechanism in an apparatus for alarming of an abnormality of tire air pressure of the present invention displays.
Figure 2:
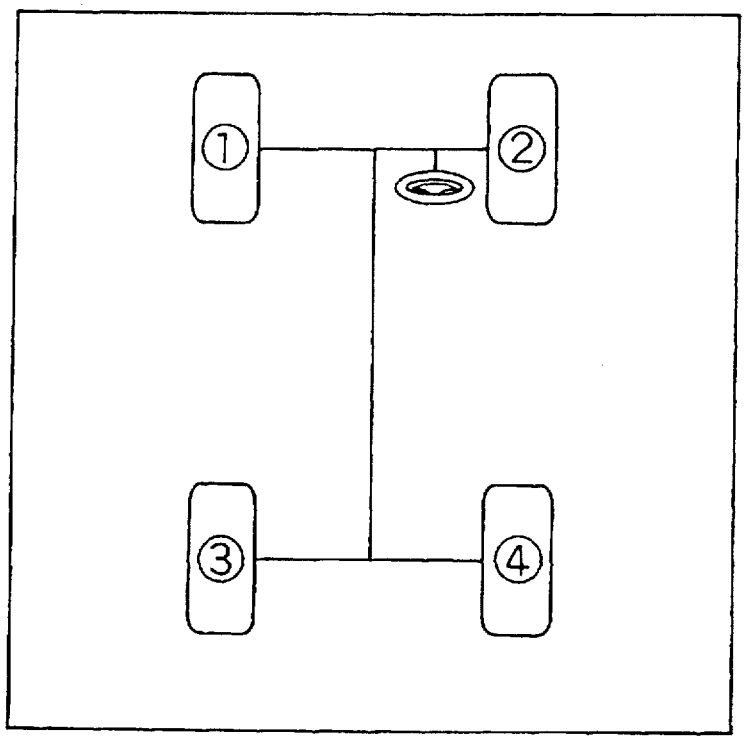
FIG. 2 shows the position of a tire corresponding to the display pattern in FIG. 1.

FIG. 1 shows one example of display patterns informing of a position of a tire where abnormality of tire air pressure has occurred, and FIG. 2 shows the position of the tire corresponding to the display pattern. In FIG. 1, the rising time t1 of blinking is about 0.2 sec. and the maximum 4 times of blinking are performed at an interval of about 0.4 sec. in a regular passenger car with four tires. To inform of the number of blinking without being mistaken, it is desirable that the interval between the final rising and next first rising is about 2 sec. Moreover, the t1 and t2 are not limited to the value stated above, and it is possible to suitably select t1 between 0.1 and 0.6 sec. and t2 between 1 and 4 sec.

Figure 3:
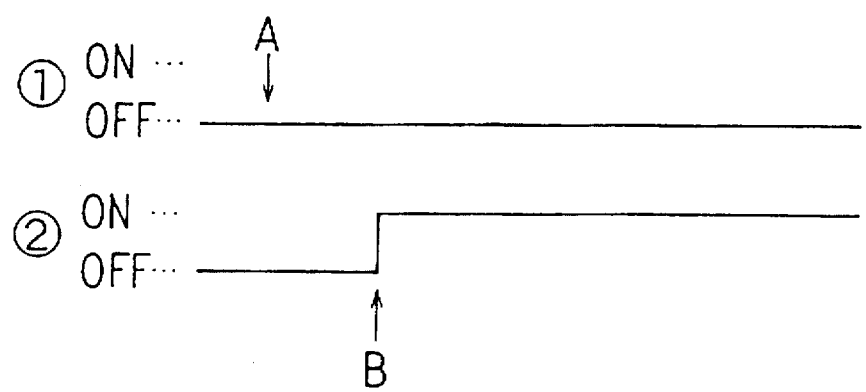
FIG. 3 shows another example of display patterns that a display mechanism in an apparatus for alarming of an abnormality of tire air pressure of the present invention displays.

FIG. 3 shows one example of display patterns informing of a failure in the display mechanism or detection mechanism.

For example, the pattern remains being OFF if the display mechanism fails even if the display mechanism is turned on at the point A (Refer to ① in FIG. 3). Moreover, when other mechanisms such as a detection mechanism fail, the ON state is maintained from the point B where the failure is detected (Refer to ② in FIG. 3). Thus, it is possible to verify at a glance whether the display mechanism failed, or the detection mechanism and the like failed.

Figure 4:
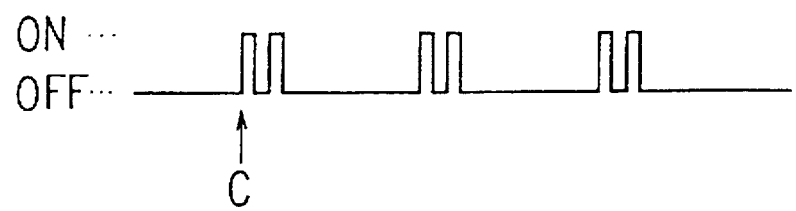
FIG. 4 shows still another example of display patterns that a display mechanism in an apparatus for alarming of an abnormality of tire air pressure of the present invention displays.

FIG. 4 shows one example of display patterns informing of the state of calibration.

When it is assumed that the calibration starts at the point C, a constant display pattern (twice blinking in FIG. 4) is continued to show the state of calibration, and the display pattern changes (for example, OFF state is maintained) to show the end of the calibration.

Figure 5:
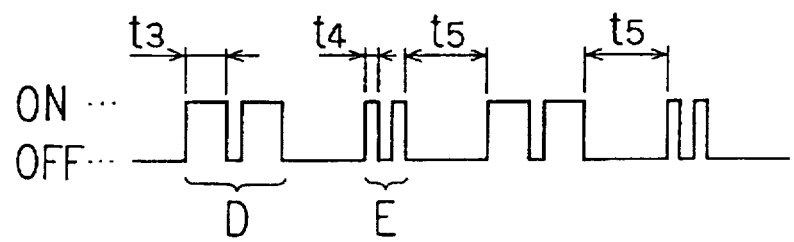
FIG. 5 shows yet another example of display patterns that a display mechanism in an apparatus for alarming of an abnormality of tire air pressure of the present invention displays.

FIG. 5 shows one example of display patterns in which two patterns with different rising time are combined.

For example, it is desirable that the rising time t3 of the pulse constituting the section D is 1 sec., the rising time t4 of the pulse constituting the section E is 0.2 sec., and the interval t5 is 2 sec. in order to allow the display pattern to be clearly recognized.

Moreover, for example, the section D shows the start code indicating the head of the arrays of contents of failures when plural failures have occurred, and the number of pulses in the section E shows the number corresponding to the kind of the failure.

The alarming apparatus of the present invention further increases the quantity of information to be displayed with switching mechanism such as pushbutton type switches in addition to the display patterns.

For example, it is possible for a driver to know which tire the abnormality occurred by observing the display pattern in FIG. 1. Thereafter, operating the switching mechanism would display the display pattern indicating the degree of air pressure abnormality to judge whether the driver should immediately stop the driving or should go to a replacement station such as a service station.

The alarming apparatus of the present invention is capable of informing of the abnormality alarm, failure, or state of calibration with one display mechanism. Therefore, it is possible to reduce the occupying area of the combination meter display section of a vehicle, with a reduced cost.

Though several embodiments of the present invention are described above, it is to be understood that the present invention is not limited only to the above-mentioned and various changes and modifications may be made in the invention without departing from the spirit and scope thereof.

What is claimed is:

1. An apparatus for alarming of an abnormality in a tire air pressure detection system for each of at least one tire, comprising a detection mechanism capable of detecting an abnormality in the detection system, and only one alarm display mechanism capable of displaying a plurality of display patterns, said alarm display mechanism having a display element, wherein said display element is switched between on and off states in predetermined sequences, and each of said plurality of display patterns is different from one another and has a unique predetermined sequence, to inform of a plurality of different kinds of information corresponding to said plurality of display patterns, said plurality of different kinds of information including detection of at least an abnormality with respect to a first tire of said at least one tire and of an abnormality with respect to a second tire of said at least one tire.

2. The apparatus of claim 1, wherein one of the kinds of information about which the display pattern informs is a position of a tire having an abnormality of tire air pressure detected by the detection mechanism.

3. The apparatus of claim 1, wherein two of the kinds of information about which the display pattern informs are failure of the detection mechanism and failure of the display mechanism.

4. An apparatus for alarming of an abnormality in a tire air pressure detection system for each of at least one tire, comprising a detection mechanism capable of detecting an abnormality in the detection system, only one alarm display mechanism capable of displaying a plurality of display patterns, said alarm display mechanism having a display element, and a switching mechanism connected to the alarm display mechanism; wherein, said display element is switchable between on and off states in predetermined sequences, each of said plurality of display patterns is different from one another and has a unique predetermined sequence, to inform of a plurality of different kinds of information corresponding to said plurality of display patterns, said plurality of different kinds of information including detection of at least an abnormality with respect to a first tire of said at least one tire and of an abnormality with respect to a second tire of said at least one tire, and when the switching mechanism is entered after the alarm display mechanism has once given an alarm informing of an abnormality in tire air pressure, said alarm display mechanism is switchable to a displaying pattern to inform of at least one of the group consisting of the position of a tire, with said displaying pattern, of which air pressure abnormality has been detected and of the degree of air pressure abnormality.

5. An apparatus for alerting of an abnormality in a tire air pressure detection system for each of at least one tire, comprising a detection mechanism capable of detecting an abnormality in the detection system, and only one alerting mechanism capable of alerting of a plurality of alerting patterns said alerting mechanism having a broadcast element, wherein said broadcast element is switchable between on and off states in predetermined sequences, and each of said plurality of alerting patterns is different from one another and has a unique predetermined sequence, to inform of a plurality of different kinds of information corresponding to said plurality of alerting patterns, said plurality of different kinds of information including detection of at least an abnormality with respect to a first tire of said at least one tire and of an abnormality with respect to a second tire of said at least one tire.

6. The apparatus of claim 5, wherein the only one alerting mechanism is a visual display mechanism.

7. The apparatus of claim 5, wherein the only one alerting mechanism is an aural alerting mechanism.

* * * * *